United States Patent [19]

Winslow

[11] 3,994,732

[45] Nov. 30, 1976

[54] DRY SILVER TONERS

[75] Inventor: John M. Winslow, South St. Paul, Minn.

[73] Assignee: Minnesota Mining and Manufacturing Company, St. Paul, Minn.

[22] Filed: Sept. 8, 1975

[21] Appl. No.: 611,025

[52] U.S. Cl. ..............96/114.1; 96/52; 96/96; 427/150

[51] Int. Cl.² ........G03C1/02; G03C 7/00; G03C 1/10; B41C 1/06

[58] Field of Search .....96/48, 48 HD, 52, 74, 77, 96, 112, 114.1, 114.6; 427/150

[56] References Cited

UNITED STATES PATENTS

| | | | |
|---|---|---|---|
| 3,816,122 | 6/1974 | Hamb | 96/114.1 |
| 3,847,612 | 11/1974 | Winslow | 96/114.1 |
| 3,911,171 | 10/1975 | Janssens et al. | 427/150 |

OTHER PUBLICATIONS

Addition of maleic anhydride to phthalazine CA-08211072906R, Griffin et al.

*Primary Examiner*—David Klein
*Assistant Examiner*—L. V. Falasco
*Attorney, Agent, or Firm*—Alexander, Sell, Steldt & Delahunt

ABSTRACT

A combination of phthalazine and certain aromatic acids or anhydrides thereof serves as a toner during heat development of exposed dry silver image forming sheet materials.

7 Claims, No Drawings

DRY SILVER TONERS

Photosensitive, heat-developable, dry silver sheet materials, as described for example in U.S. Pat. No. 3,457,075 (issued July 22, 1969), contain a photosensitive silver halide catalyst-forming means in catalytic proximity with a heat sensitive combination of a light stable organic silver compound and a reducing agent therefor. When struck by light, the silver halide catalyst-forming means produces silver nuclei which serve to catalyze the reduction of the organic silver compound, e.g., silver behenate, by the reducing agent at elevated temperatures. To improve the image density and color it has been found desirable to include toners in the sheet construction. Phthalimide has been known as such a toner.

In U.S. Pat. No. 3,080,254 (issued Mar. 5, 1963), phthalazinone is described as a toner for dry silver sheets. Phthalazinone, however, has been found to cause slight dusting that becomes noticeable during heat development of large numbers of the exposed sheets. The dusting problem can be avoided by using as toner a combination of an imidazole and phthalic acid, naphthalene-2,3-dicarboxylic acid of phthalamic acid, as described in U.S. Pat. No. 3,847,612 (issued Nov. 12, 1974), if a hindered phenolic reducing agent for silver ion is also present in the sheet, but the resulting dry silver sheets tend to have lower optical speed and to have lower light stability after development than sheets containing phthalazinone toner.

In accordance with the practice of the present invention, it has now been found possible to provide photosensitive, heat-developable, dry silver imaging sheets which give dense black images, do not emit dust-forming vapors during development, have good light stability after development, are useful even in dry silver sheets containing relatively weak reducing agents (i.e., reducing agents which, without a toner in a dry silver sheet, produce very faint yellow rather than black images), and have good optical speed comparable to that obtained when phthalazinone is used as toner. This is achieved by using as toner a combination of phthalazine (including compounds which generate phthalazine upon heating, such as an adduct of phthalazine and maleic anhydride) and at least one compound from the classes consisting of a phthalic acid (e.g., 4-methyl phthalic acid, homo-phthalic acid, phthalic acid, etc.), a 2,3-napthalene dicarboxylic acid, ophenylene diacetic acid and anhydrides thereof. None of the compounds used in this toner combination have been found to be effective as toners when used along.

Substituted phthalazine compounds in which the carbon atoms adjacent the azo nitrogen atoms are substituted with halogen, alkyl, alkoxy, nitro, etc. and pyridazine are surprisingly not operative in the toner system of this invention.

The aromatic acids useful in the practice of the present invention are represented by the formula $$R—A—R_1$$

wherein A is phenyl or naphthyl, and $R_1$ and $R_2$ are substituents on the 2 and 3 positions of A respectively and are selected from —COOH and —$CH_2COOH$.

The phenyl or naphthyl group may preferably have in the 4 or 5 positions thereof an election donating group selected from alkyl and alkoxy of 1–20 carbon atoms. More preferably, the groups are 1–5 carbon atoms.

The amount or toner material may be varied from one construction and formulation to the next. It is therefore desirable to incorporate sufficient toner to produce the desired image benefits with minimum adverse effect on such desirable properties as shelf life. With the weak reducing agents or developers, such as the hindered phenols, a larger amount of toner should be employed than with the stronger reducing agents, such as methyl gallate, hydroquinone and methoxy hydroxy naphthalene. Toner concentration will also vary with the proportion of silver salts and other reactants as well as with the thickness of the coating and developing conditions, e.g., heat development time and temperature. Thus, for example, one construction may require a temperature of 260° F. (126° C.) with a dwell time of 3 seconds, while another may require 300° F. (147° C.) for 5 seconds, and still another may need 230° F. (110° C.) for 35 seconds, and the amount of toner and type of reducing agent may be varied accordingly. In most constructions the toner concentrations will fall in the range of 0.027 to 0.40, preferably in the range of 0.027 to 0.35 mole of phthalazine and 0.007 to 0.35, preferably in the range of 0.007 to 0.28 mole of the toner acid or anhydride per mole of total silver, with only a minor amount of the total silver being present as the photosensitive silver halide and the remaining silver being present as the light-stable organic silver compound.

For use on paper or other non-transparent backings it is found convenient to use silver half-soaps, of which an equimolar blend of silver behenate and behenic acid, prepared by precipitation from aqueous solution of the sodium salt of commercial behenic acid and analyzing about 14.5 percent silver, represents a preferred example. Transparent sheet materials made on transparent film backings require a transparent coating and for this purpose the silver behenate full soap, containing not more than about four or five percent of free behenic acid and analyzing about 25.2 percent silver, may be used. Other components, such for example as colorings, opacifiers, extenders, spectral sensitizing dyes, etc. may be incorporated as required for various specific purposes. Antifoggants, such as mercuric salts and tetrachlorophthalic anhydride, may also be included in the formulation.

EXAMPLE 1

A half soap slurry was prepared by mixing together:

| | Grams |
|---|---|
| Silver behenate half soap (45% free behenic acid and 55% silver behenate) | 9.59 |
| Acetone | 51.28 |
| Toluene | 26.36 |

and homogenizing to a smooth consistency, then adding 0.40 g. acetone, 0.10 g. $HgBr_2$ dissolved in 0.81 g. methanol and 11.46 g. of polyvinylbutryal. To each of three 23 g. samples of the final homogenized mixture was added reducing agent, phthalazine and phthalic acid in the following amounts:

| Sample | Reducing agent, g. | Phthalazine, g. | Phthalic acid, g. |
|---|---|---|---|
| 1 | [1] 10.25 | 0.02 | 0.03 |
| 2 | [2] 0.40 | 0.04 | 0.06 |
| 3 | [3] 0.40 | 0.04 | 0.06 |

[1] 2,6-bis(2'-hydroxy-3'-t-butyl-5'-methyl benzyl)-4-methyl phenol
[2] 2,2'-methylenebis-(4-methyl-6-ter. butyl phenol)
[3] 1,1-di-(ortho methyl phenol)-3-methyl-5,5-dimethyl hexane To each of the three samples was then added about 2 drops of Lith 454* dye sensitizer solution (0.10 gram in 10 ml. methanol), 0.02 gram of tetrachlorophthalic anhydride and 10 drops of mecuric acetate solution (10 grams in 100 ml. methanol). Each of the three sample solutions were coated at 3.5 mils (1 g. per square foot dry coating weight) onto a paper substrate and dried for 2½ minutes at 190° F. (89° C.). The resultant coatings were exposed (10,000 meter candle seconds of incident tungsten light) to a 0–4 continuous wedge in an exposing sensitometer and developed with the following results:

*

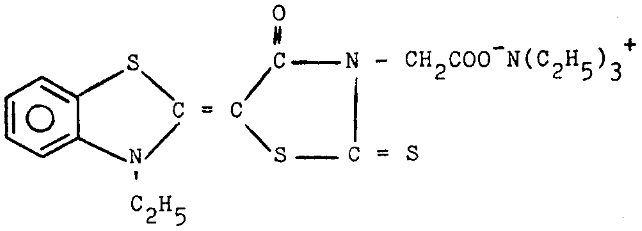

| Sample | D min. | D max. | Speed (paper) | Gamma | Time of Development at 260° F., Sec. |
|---|---|---|---|---|---|
| 1 | 0.12 | 1.59 | 27 | 1.5 | 8 |
| 2 | 0.13 | 1.61 | 18 | 1.5 | 8 |
| 3 | 0.11 | 1.38 | 12 | 1.5 | 9 |

All images were dense black. Similar results are obtained when the phthalic acid is replaced by 2,3-naphthalene dicarboxylic acid or phthalic anhydride. The acids may also be mixed together for use. This example illustrates the use of all of the reactive ingredients in a single layer.

EXAMPLE 2

To the same final homogenized mixture as in Example 1 was added 2 drops of Lith 454 dye sensitizer solution (0.10 gram in 10 ml. methanol). Onto 2 samples of paper substrate was coated the resulting mixture (3 mils wet coating thickness) and dried for 3 minutes at 150° F. (75° C.) to give a dry coating weight of 1 gram per square foot.

A second coating mixture was prepared with the following ingredients:

| | Grams |
|---|---|
| Cellulose acetate resin | 5.2 |
| Colloidal silica particles ("Syloid 244". a tradename of W. R. Grace Company) | 0.4 |
| Acetone | 72.5 |
| Methanol | 19.8 |
| Methyl ethyl ketone | 2.1 |

The resulting mixture was divided into two portions, A and B, to which the following additions were made:

| | Phthalazine, g. | Phthalic acid, g. | Tetrachlorophthalic anhydride, g. |
|---|---|---|---|
| A | 0.125 | 0.375 | 0.125 |
| B | 0.375 | 0.125 | 0.125 |

and each portion was then coated (dry coating weight of 0.25 g. per square foot) onto one of the previously coated paper substrate samples. Both samples were exposed (10,000 meter candle seconds of incident tungsten light) to a 0–4 cotinuous wedge in an exposing sensitometer and developed for 12 seconds at 250° F. (121° C.).

| | D min. | D max. | Speed | Gamma |
|---|---|---|---|---|
| A | 0.08 | 1.45 | 4.34 | 2.03 |
| B | 0.11 | 1.55 | 4.82 | 2.21 |

EXAMPLE 3

A full soap slurry was prepared by homogenizing the following:

| | Parts by weight |
|---|---|
| Methyl ethyl ketone | 60.03 |
| Methyl isobutyl ketone | 5.09 |
| Toluene | 20.00 |
| Full soap of silver behenate (96% silver behenate, 4% free behenic acid | 13.00 |

A first coating composition was made by adding to 310 grams of the above homogenized mixture the following:

| | |
|---|---|
| Polyvinylbutyral | 2 g. |
| 0.5M mercuric bromide (in methanol) | 3 ml. |
| Mercuric acetate (5 wt.% in methanol) | 3.5 ml. |

and digesting for 4 hours. Then the following was added:

| | |
|---|---|
| Polyvinylbutyral | 40 g. |
| Lith 454 sensitizing dye (0.10 gram in 10 grams of n-methyl Pyrrolidone) | 4 ml. |
| Tetrachlorophthalic anhydride (dissolved in about 25 g. methanol) | 2.8 g. |

and mixed for one hour, after which it was coated onto a substrate and dried for 2½ minutes at 190° F. (89° C.) to provide a dry coating weight of 1.7 g. per square foot.

A second coating composition with the following components was prepared:

| | Grams |
|---|---|
| Methanol | 25 |
| Acetone | 25 |
| Tetrachlorophthalic anhydride | 0.4 |
| Phthalazine | 0.6 |
| Phthalic acid | 0.6 |
| 1,1-di-(ortho-methylphenol)-3-methyl-5,5-dimethyl hexane | 4 |

This was agitated until the solids were dissolved, then 50 g. of cellulose acetate propionate solution (10 g. of cellulose acetate propionate in a mixture of 50 g. methanol and 50 g. acetone) were added. The resulting second coating composition was coated over the previously coated substrate and dried for 2½ minutes at 190° F. (89° C.), providing a dry coating weight of 0.72 g. per square foot for the second coating. The coated substrate was then divided into three samples, which were treated as follows:

Sample 1 was exposed (10,000 meter candle seconds of incident tungsten light) to a 0–4 continuous wedge in an exposing sensitometer and developed for 10 seconds at 260° F. (126° C.). The resulting imaged sheet had D max. of 3.20, D min. of 0.06, and a Speed of $6.5\times10^{-3}$ at a density of 1 above base plus fog.

Sample 2 was heated for 10 seconds at 260° F. (126° C.) and was then exposed and developed in the same manner as Sample 1. No visible image was obtained, due to the heat stabilization step which preceded exposure.

Sample 3 was exposed and developed in the same manner as Sample 1. The imaged film then was exposed to a carbon arc for approximately 100 seconds (10,000 meter candle seconds of incident tungsten light) and was reheated to 260° F. (126° C.) for 10 seconds. The imaged sheet had a D max. of 3.4 and a D min. of 0.09. The initial stabilization effectively prevented background darkening upon the re-exposure and reheating, indicating that the stabilization occurs upon heating during the develoment step. If phthalazinone is substituted for the phthalazine on an equimolar basis, this same phenomenon is not observed.

EXAMPLE 4

A full soap homogenate (620 grams) was prepared as in Example 3. To this homogenate was added 4 g. polyvinylbutyral, 7 ml. of sensitizing dye solution (0.10 g. of Lith 454 in 10 g. of n-methyl pyrrolidone), and 1.9 g. triphenylmethyl bromide (predissolved in a mixture of 12.5 g. methyl alcohol and 12.5 g. acetone). This was mixed for 3 hours. To approximately 23 g. of the resulting solution was added 0.2 g. tetrachlorophthalic anhydride which had been predissolved in a mixture of 2 ml. methyl alcohol and 2 ml. acetone. The solution was coated (4 mil wet thickness) onto a substrate and dried for 3 minutes at 190° F. (89° C.)

A second coating composition was prepared with the following ingredients:

| | Grams |
|---|---|
| Acetone | 8 |
| 1,1,2-trichloroethane | 8 |
| Methanol | 4 |
| Tetrachlorophthalic anhydride | 0.3 |
| Phthalic acid | 0.15 |
| Phthalazine | 0.15 |
| 1,1-di-(ortho methyl phenol)-3-methyl-5,5-dimethyl hexane | 1.0 |

To this composition was added sufficient cellulose acetate resin (75 g. resin in 375 g. methyl ethyl ketone) to make approximately 25 g. total coating composition. This was coated (3 mil wet thickness) over the first coating and dried for 2½ minutes at 190° F. (89° C.). The film was exposed (10,000 meter candle seconds of incident, blue filtered tungsten light) to a 0–4 continuous wedge in an exposing sensitometer and divided into four samples, each developed as follows:

| Sample | Time of Development at 240° F. | D. Max. | D min. (base + fog) |
|---|---|---|---|
| 1 | 10 sec. | 1.50 | 0.08 |
| 2 | 20 sec. | 3.20 | 0.10 |
| 3 | 30 sec. | 3.50 | 0.16 |
| 4 | 40 sec. | 3.55 | 0.20 |

Even though these samples did not contain a mercury salt, they exhibit the same stabilization phenomena shown in the previous example.

EXAMPLE 5

A first coating solution was prepared as in Example 2. To this solution was added 0.5 cc. of Lith 454 dye sensitizer solution (0.1 g. in 10 ml methanol). This was coated at 3 mils thickness (1.0 g. per square foot) onto a 45 pound weight paper backing which was then dried for 3 minutes at 170° F. (71° C.).

A second coating mixture of cellulose acetate and Syloid 244 was prepared as in Example 2. Phthalazine was added to this mixture in a concentration of 0.4 g. per 100 grams of resin solution. The final solution was divided into five 25 gram portions A, B, C, D and E, to which portions the following additions were made:

| | | Gram |
|---|---|---|
| A | Phthalic acid | 0.1 |
| B | 4-methyl phthalic acid | 0.1 |
| C | Homophthalic acid | 0.1 |
| D | O-phenyleneacetic acid | 0.1 |
| E | 4-nitro phthalic acid | 0.1 |

These portions were then coated at 3 mils (0.25 g. per square foot) onto the first coating and dried for 3 minutes at 170° F. (71° C.).

The five samples were then exposed (10,000 meter candle seconds of incident tungsten light) to a 0–4 continuous wedge in an exposing sensitometer and then developed at 250° F. (121° C.). The results are shown in the following table:

| Sample | Dwell time | D min. | D max. | Speed | Contrast |
|---|---|---|---|---|---|
| A | 12 | .13 | 1.51 | 9.8 | 1.8 |
| B | 12 | .14 | 1.63 | 11.5 | 1.9 |
| C | 9 | .12 | 1.50 | 8.4 | 1.7 |
| D | 30 | .10 | 0.83 | 0.5 | 0.5 |
| E | 30 | .10 | 0.22 | 0.0 | 0.0 |

As can be seen from the above, the addition of electropositive groups does maintain or improve the efficacy of the toners (Sample B) while the addition of electronegative groups reduces the efficiency of the toners (Sample E). Carboxy groups bound to the aromatic ring through methyl linkage (especially Sample D) also have adverse effects on toners.

All of the acids, substituted in the aromatic ring or not, may be produced according to the following general method. The reactants are selected to have the appropriate substituent groups:

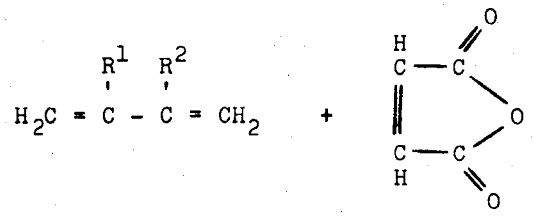

wherein $R^1$ and $R^2$ are independently H, $CH_3$, $CH_3CH_2$, $OCH_3$, $C_nH_n$, or are fused to form a phenyl ring (with n without alkyl or alkoxy substituents in the 4 or 5 positions).

These two reactants, upon addition, will react to form:

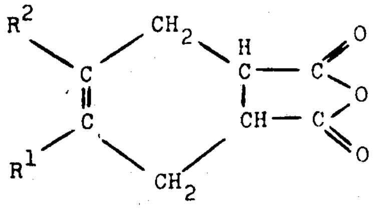

This intermediate is then refluxed with acetic acid and $Br_2$ to aromatize the carbon cyclic ring to:

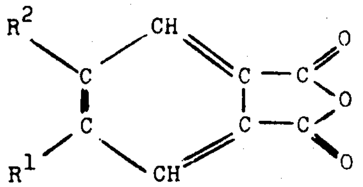

and then converted to the acid by boiling water, becoming

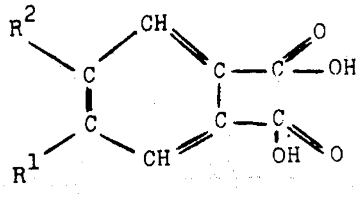

What I claim is:

1. In a photosensitive, heat-developable, dry silver sheet material containing an image-forming system including a photosensitive silver halide catalyst-forming means and, as heat image forming means, an organic silver compound and a reducing agent therefor, the oxidation reduction reaction of which to produce a visible image is accelerated by said catalyst, and sufficient toner to increase the density of said visible image, the improvement characterized by said toner being a mixture of (a) phthalazine and (b) at least one acid of the formula:

$$R—A—R_1$$

wherein A is phenyl or naphthyl and R and $R_1$ are selected from —COOH and $CH_2COOH$, R and $R^1$ bonded respectively to the 2 and 3 positions of $A_1$ and anhydrides of said acid $R—A—R_1$.

2. The dry silver sheet material of claim 1 wherein said reducing agent is a weak reducing agent.

3. The dry silver sheet material of claim 1 wherein said (b) is phthalic acid.

4. The dry silver sheet material of claim 1 wherein said (b) is phthalic anhydride.

5. The dry silver sheet material of claim 1 wherein said (b) is 2,3-naphthalene dicarboxylic acid.

6. The dry silver sheet material of claim 1 wherein A is substituted in the 4 or 5 position by an alkyl or alkoxy group of 1–20 carbon atoms.

7. The dry silver sheet material of claim 6 wherein (b) is 4-methyl phthalic acid.

* * * * *

UNITED STATES PATENT AND TRADEMARK OFFICE
CERTIFICATE OF CORRECTION

PATENT NO. : 3,994,732

DATED : November 30, 1976

INVENTOR(S) : John M. Winslow

It is certified that error appears in the above-identified patent and that said Letters Patent are hereby corrected as shown below:

Column 2, line 62 "10.25" should be --0.25--.

Signed and Sealed this

Twenty-second Day of March 1977

[SEAL]

*Attest:*

RUTH C. MASON
*Attesting Officer*

C. MARSHALL DANN
*Commissioner of Patents and Trademarks*